(12) United States Patent
Han

(10) Patent No.: US 9,118,248 B2
(45) Date of Patent: Aug. 25, 2015

(54) NATURALLY FREEWHEELING ALTERNATING CURRENT CHOPPER MAIN CIRCUIT STRUCTURE

(76) Inventor: Yalan Han, Foshan (CN)

( * ) Notice: Subject to any disclaimer, the term of this patent is extended or adjusted under 35 U.S.C. 154(b) by 0 days.

(21) Appl. No.: 14/362,819

(22) PCT Filed: May 9, 2012

(86) PCT No.: PCT/CN2012/075228
§ 371 (c)(1),
(2), (4) Date: Sep. 17, 2014

(87) PCT Pub. No.: WO2013/134994
PCT Pub. Date: Sep. 19, 2013

(65) Prior Publication Data
US 2015/0028833 A1   Jan. 29, 2015

(30) Foreign Application Priority Data
Mar. 12, 2012   (CN) .......................... 2012 1 0062805

(51) Int. Cl.
*H02M 5/293* (2006.01)

(52) U.S. Cl.
CPC ...... *H02M 5/293* (2013.01); *H02M 2005/2932* (2013.01)

(58) Field of Classification Search
CPC .................. H02M 5/293; H02M 2005/2932

USPC .......................... 323/222, 225, 271, 272, 282
See application file for complete search history.

(56) References Cited

U.S. PATENT DOCUMENTS

| | | | | |
|---|---|---|---|---|
| 6,201,368 B1* | 3/2001 | Webster | ......................... | 318/729 |
| 8,547,053 B2* | 10/2013 | Chen et al. | ..................... | 318/813 |
| 8,760,128 B2* | 6/2014 | Xu et al. | ........................ | 323/222 |
| 2006/0103365 A1* | 5/2006 | Ben-Yaacov | ................. | 323/313 |
| 2012/0243279 A1* | 9/2012 | Zacharias et al. | ............. | 363/131 |

FOREIGN PATENT DOCUMENTS

CN    202513831 U    10/2012

\* cited by examiner

*Primary Examiner* — Jessica Han
(74) *Attorney, Agent, or Firm* — IPro, Inc.; Na Xu

(57) ABSTRACT

The present disclosure provides a naturally freewheeling alternating (AC) current chopping main circuit structure. The naturally freewheeling AC chopping main circuit structure includes an AC chopping main circuit (1) and inductive load (2). The AC chopping main circuit includes a chopping switch element assembly (3), two inductance coils (L1 and L2), two diodes (D1 and D2), and a capacitor (C). The two inductance coils and the two diodes are connected to form a closed circulatory circuit while the circulatory circuit implements natural freewheeling of a chopping current in the two induction coils when the chopping switch element assembly is switched off.

10 Claims, 4 Drawing Sheets

NATURALLY FREEWHEELING ALTERNATING CURRENT CHOPPER MAIN CIRCUIT STRUCTURE

This application is a national stage application of PCT application PCT/CN2012/075228 filed on May 9, 2012, which is based on and claims priority to Chinese patent application 201210062805.X filed on Mar. 12, 2012 in China. The entirety of each of the above-mentioned applications is hereby incorporated by reference herein in its entirety.

TECHNICAL FIELD

The present disclosure relates to the field of alternating current chopping voltage regulating technique of commercial power, and more particularly to a naturally freewheeling alternating current chopping main circuit structure.

BACKGROUND

As shown in FIG. 1, alternating current (AC) chopping is one of the best techniques to achieve voltage regulating of commercial power. If an inductive load is connected to an AC chopping, because of an effect of inductive reactance, a freewheeling must be proceeding when the chopping switch is off. Currently, the commonly used solutions of freewheeling are realized by parallel connecting an AC chopping switch with an electronic switch for freewheeling. That is to say, regardless of the specific structure of the chopping switch circuit, parallel connecting a chopping switch 1 with a freewheeling switch 2 is essential. Both the chopping switch and the freewheeling switch adopt Insulated Gate Bipolar Transistor (IGBT) switch components. It takes some time to turn on and turn off the IGBT switch components. To prevent a short circuit on the chopping circuit that might be caused by turning on the freewheeling switch 2, control signals for chopping electronic switch and freewheeling electronic switch has to be accurately controlled, and an interval time has to be set between the turning off time of the chopping wave electronic switch and turning on time of the freewheeling electronic switch. The interval time is called as "dead time". Because of the dead time, there is a delay with the freewheeling when the chopping electronic switch is turned off, and because of the dead time, there is a limit to further improve the frequency of the AC chopping. When proceeding three phase AC chopping, a more accurate and complicated controlling to a phase position of the control signals of chopping electronic switch and freewheeling electronic switch is needed.

SUMMARY

In view of the above-described problems, an object of the present disclosure is to provide a naturally freewheeling alternating current (AC) chopping main circuit structure without a freewheeling switch element. In present disclosure, a naturally freewheeling ring circuit is achieved in the main circuit structure by connecting two inductance coils with two diodes, achieving a timely freewheeling at the moment of turning off the chopping electronic switch. The AC chopping main circuit structure in present invention is a naturally freewheeling AC chopping main circuit structure without any control.

The object of the present disclosure is achieved by the following technical solution.

A naturally freewheeling AC chopping main circuit structure comprises, an AC chopping main circuit connected to a commercial power, and an inductive load; wherein the AC chopping main circuit comprises, a chopping switch element assembly, two inductance coils L1 and L2, two diodes D1 and D2, and a capacitor C, one end of inductance coil L1 and one end of inductance coil L2 are connected together to form a junction point, the junction point is connected to one end of the capacitor C, the other end of the inductance coil L1 is connected with a negative electrode of the diode D1 in series, the other end of the inductance coil L2 is connected with a positive electrode of the diode D2 in series, an output end of the chopping switch element assembly is connected with a junction point of the positive electrode of the diode D1 and the negative electrode of the diode D2, an input end of the chopping switch element assembly and the other end of the capacitor are connected with the commercial power line respectively, the inductive load is connected with the capacitor C in parallel, a closed circulatory circuit is formed with the connection between the inductance coils L1 and L2 and the diodes D1 and D2, therefore a naturally freewheeling in the two inductance coils is achieved when the chopping switch element is turned off via the circulatory circuit.

The object of the present disclosure can also be achieved by the following technical solution.

In an embodiment, the inductance coils L1 and L2 are air-core coils, magnetic core coils or iron-core coils.

In an embodiment, the input end of the chopping switch element assembly and the other end of the capacitor are connected with a phase line and a neutral line of a single-phase circuit respectively.

In an embodiment, the AC chopping main circuit comprises a chopping switch element assembly, inductance coils L1-1, L1-2, L2-1, L2-2, and L3, two diodes D1 and D2 and capacitors C1, C2, C3, and C4, a positive electrode of the diode D1 is connected with a negative electrode of the diode D2, a negative electrode of the diode D1 is connected with the inductance coils L1-1 and L1-2 in series, a positive electrode of the diode D2 is connected with the inductance coils L2-1 and L2-2 in series, one end of the inductance coil L1-2 and one end of the inductance coil L2-2 are connected together to form a junction point, the junction point is connected with one end of the capacitor C3, one end of the inductance coil L3 is connected with one end of the capacitor C3, the other end of the inductance coil L3 is connected with one end of the capacitor C4, a junction point between the inductance coils L2-1 and L2-2 is connected with one end of the capacitor C1, a junction point between the inductance coils L1-1 and L1-2 is connected with one end of the capacitor C2, an output end of the chopping switch element assembly 3 is connected with a junction point between a positive electrode of the diode D1 and a negative electrode of the diode D2, an input end of the chopping switch element assembly and a junction point of the other ends of the capacitors C1, C2, C3, and C4 are connected with a commercial power line respectively, the inductive load is connected with the capacitor C4 in parallel.

In an embodiment, the alternating current chopping main circuit is applied to a three phase circuit.

In an embodiment, the chopping switch element assembly comprises an Insulated Gate Bipolar Transistor (IGBT) transistor and a rectifier bridge.

In an embodiment, the chopping switch element assembly comprises two IGBT transistors.

The beneficial effects of the embodiments of the present invention are as follow:

1) In the embodiments of the present invention, the naturally freewheeling is achieved, so the freewheeling can be achieved in time when the chopping switch is turned off. The freewheeling effect achieved by the embodiments of the present invention is better than that achieved by using a freewheeling switch element.

2) The structure of the chopping main circuit is simpler. Comparing to the prior art, the electronic switch element used for freewheeling is saved, and the work reliability of the chopping circuit is improved.

3) Because there is no current mutation cutoff on the load, the AC voltage wave shape on the load is close to a sinusoidal wave. Therefore, AC chopping voltage regulating due to a load of any property can be used to produce a universal alternating current chopper.

4) A high current generation device with low voltage whose output current can be adjusted in a large range can be produced by using the embodiments of the present invention.

5) An AC/DC (direct-current) current source with automatic voltage regulation function can be produced by using the embodiments of the present invention.

DETAILED DESCRIPTION

The embodiments of the present invention will be further described in accordance with the Figures and preferred embodiments.

Embodiment 1

Shown as FIGS. 2 to 7, a naturally freewheeling alternating current (AC) chopping main circuit structure, comprises an AC chopping main circuit 1 connected with a commercial power, and an inductive load 2, in which, the AC chopping main circuit 1 comprises a chopping switch element assembly 3, inductance coils L1 and L2, diodes D1 and D2, and a capacitor C, one end of inductance coil L1 and one end of inductance coil L2 are connected together to be a junction point, the junction point is connected with one end of capacitor C, the other end of the inductance coil L1 is connected with a negative electrode of the diode D1 in series, the other end of the inductance coil L2 is connected with a positive electrode of the diode D2 in series, an output end of the chopping switch element assembly is connected with a junction point of the positive electrode of the diodes D1 and the negative electrode of the diodes D2, an input end of the chopping switch element assembly 3 and the other end of the capacitor are connected with the commercial power line respectively, two ends of a load 2 are connected with two ends of the capacitor C in parallel, a closed circulatory circuit is formed with a connection between the inductance coils L1 and L2 and the diodes D1 and D2, therefore a naturally freewheeling in the two inductance coils is achieved by the circulatory circuit when the chopping switch element is turned off.

Because of the diodes D1 and D2, only a chopping current i1 corresponding to a positive half cycle wave shape of the commercial power is allowed to pass through the inductance coil L1. In the positive half cycle of the commercial power, when the chopping switch element is turned off, the freewheeling is achieved by inductance coil L1 through a current path formed with the inductance coil L2, diodes D2 and D1.

Because of the diodes D1 and D2, only a chopping current i2 corresponding to a negative half cycle wave shape of the commercial power is allowed to pass through the inductance coil L2. In the negative half cycle of the commercial power, when the chopping switch element is turned off, the freewheeling is achieved by inductance coil L2 through a current path formed with the inductance coil L1, diodes D2 and D1.

The inductance coils L1 and L2 are air-core coils, magnetic core coils or iron-core coils.

The input end of the chopping switch element assembly and the other end of the capacitor are respectively connected with a phase line and a neutral line of a single-phase circuit.

Embodiment 2

Figure 1:
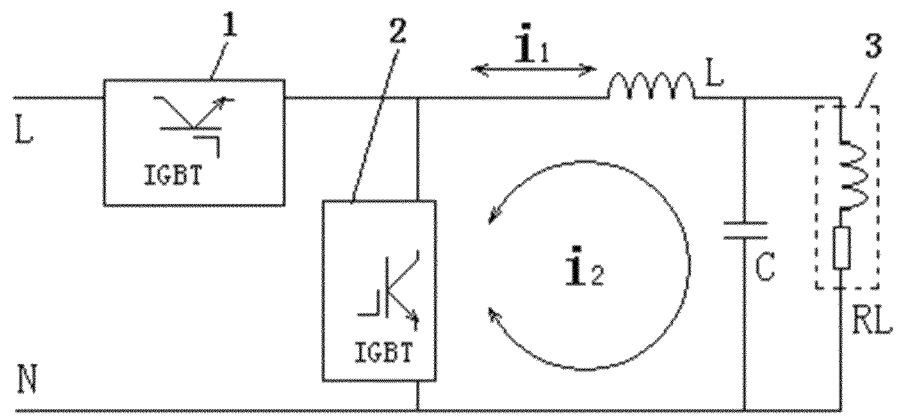
FIG. 1 is a circuit diagram of the prior art.
Figure 2:
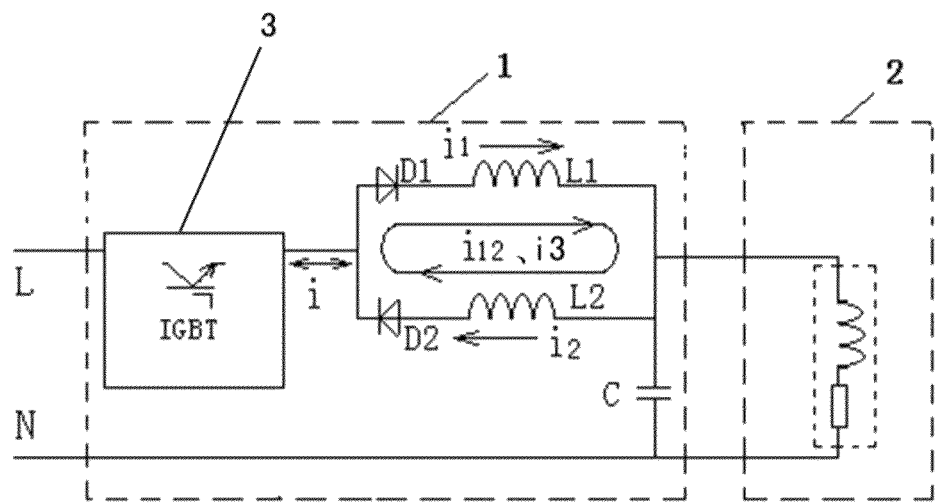
FIG. 2 is a circuit diagram according to a first embodiment of the present disclosure.
Figure 3:
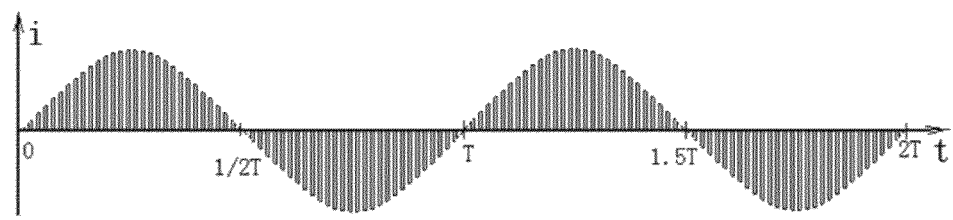
FIG. 3 is a wave shape diagram of a current i which is formed by the commercial power passing through the AC chopping switch element according to the first embodiment of the present disclosure.
Figure 4:
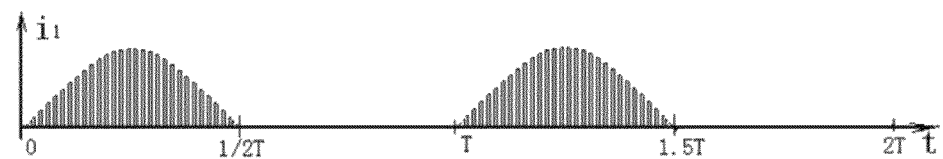
FIG. 4 is a wave shape diagram of a chopping current i1 passing through the diode D1 and inductance coil L1 according to the first embodiment of the present disclosure.
Figure 5:
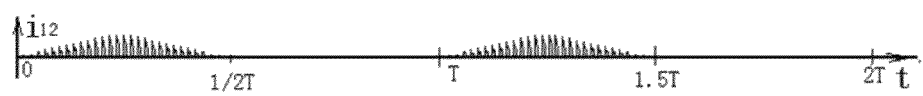
FIG. 5 is a wave shape diagram of a freewheeling current i12 passing through the inductance coil L1 according to the first embodiment of the present disclosure.
Figure 6:
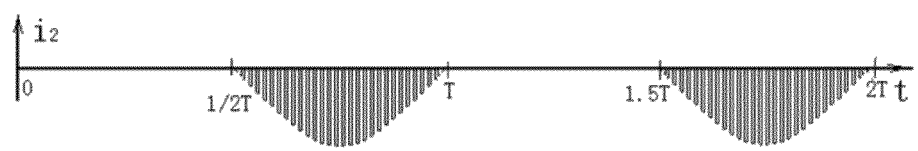
FIG. 6 is a wave shape diagram of a chopping current i2 passing through the diode D2 and the inductance coil L2 according to the first embodiment of the present disclosure.
Figure 7:
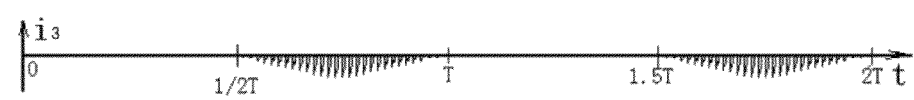
FIG. 7 is a wave shape diagram of a freewheeling current i3 passing through the inductance coil L2 according to the first embodiment of the present disclosure
Figure 8:
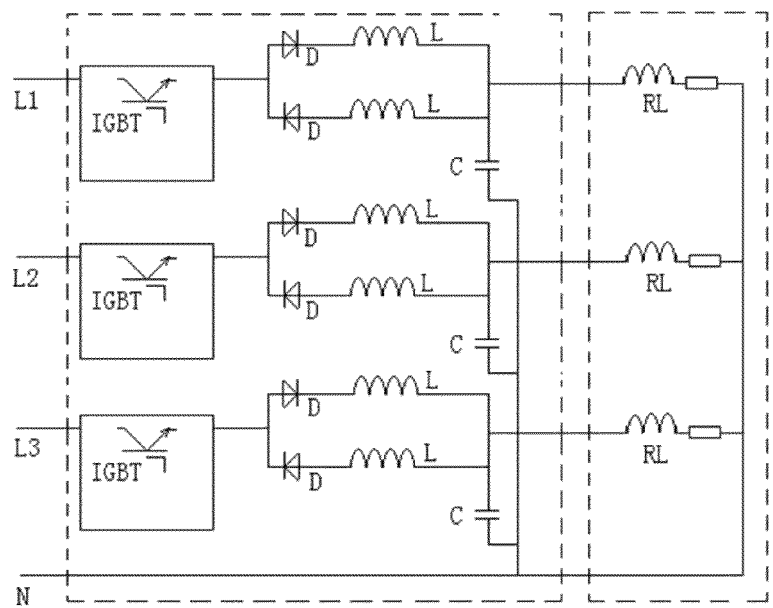
FIG. 8 is a circuit diagram according to a second embodiment of the present disclosure.

Shown as FIG. 8, the embodiment 2 is similar to the embodiment 1. The difference is that the embodiment 2 is applied to the current structure for three phase chopping voltage regulating. That is to say, the chopping switch of each phase is connected with an AC chopping main circuit for naturally freewheeling. The Specifics is not described in this specification.

Embodiment 3

Figure 9:
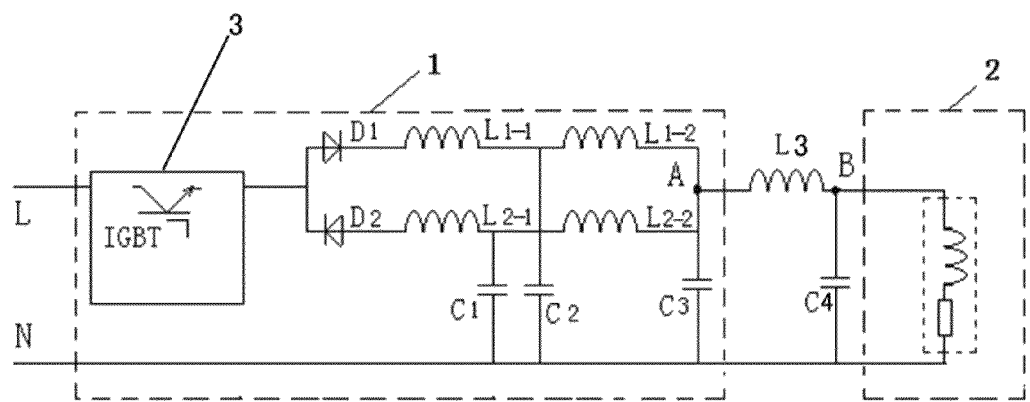
FIG. 9 is a circuit diagram according to a third embodiment of the present disclosure.
Figure 10:
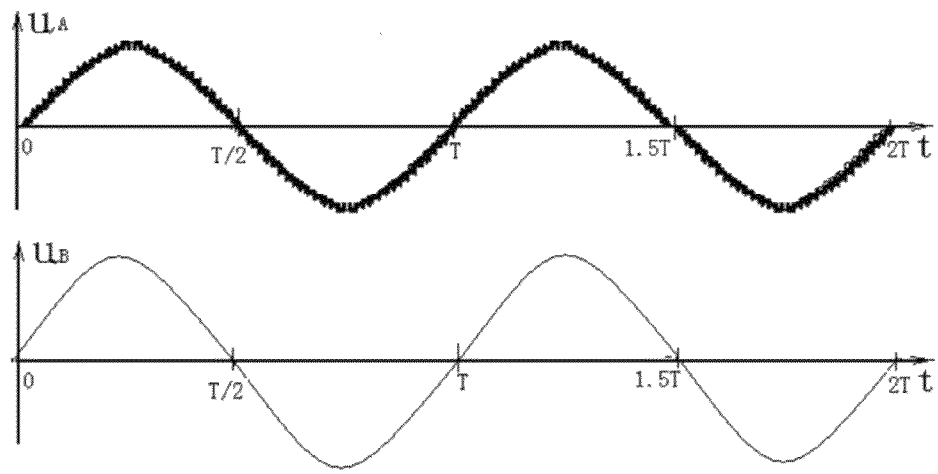
FIG. 10 is an AC voltage wave shape diagram according to the third embodiment of the present disclosure.

Shown as FIGS. 9 to 10. The AC chopping main circuit 1 comprises a chopping switch element assembly 3, multiple inductance coils L1-1, L1-2, L2-1, L2-2, and L3, two diodes D1 and D2, and multiple capacitors C1, C2, C3, and C4, a positive electrode of the diode D1 is connected with a negative electrode of the diode D2, a negative electrode of the diode D1 is connected with the inductance coils L1-1 and L1-2 in series, a positive electrode of the diodes D2 is connected with the inductance coils L2-1 and L2-2 in series, one end of the inductance coil L1-2 and one end of the inductance coil L2-2 are connected together to form a junction point A, the junction point A is connected with one end of the capacitor C3, one end of the inductance coil L3 is connected with one end of the capacitor C3, the other end of the inductance coil L3 is connected with one end of the capacitor C4, the junction point between the inductance coils L2-1 and L2-2 is connected with one end of the capacitor C1, the junction point between the inductance coils L1-1 and L1-2 is connected with one end of the capacitor C2, an output end of the chopping switch element assembly 3 is connected with a junction point between a positive electrode of the diode D1 and a negative electrode of the diode D2, an input end of the chopping switch element assembly 3 and a junction point of the other ends of the capacitors C1, C2, C3, and C4 are respectively connected with a commercial power line, two ends of a load are connected with two ends of the capacitor C4 in parallel.

To get a more smoothly edge of the AC voltage wave shape on the inductive load 2, also to get a more perfect voltage sinusoidal wave on the inductive load, a filter element is added on the AC chopping main circuit for naturally freewheeling or between the AC chopping main circuit for naturally freewheeling and the load. Each of the inductance coils is divided into two parts. A capacitor is added between the two parts of the inductance coils. And a LC circuit (comprises C3, C4 and L3) is connected with the alternating current chopping main circuit for naturally freewheeling and load circuit. Shown as FIG. 10, UA and UB are AC voltage wave shapes respectively corresponding to points A and B in FIG. 9. Although the wave shape UA is close to a sinusoidal wave, but the edge of the wave shape has a saw tooth shape. After filtered by LC circuit, the edge of the wave shape of UB is smoother and close to a normal sinusoidal wave. To further improve the voltage wave shape on the load, more filtering can be added in the alternating current chopping main circuit for naturally freewheeling and the load circuit.

Embodiment 4

Figure 11:
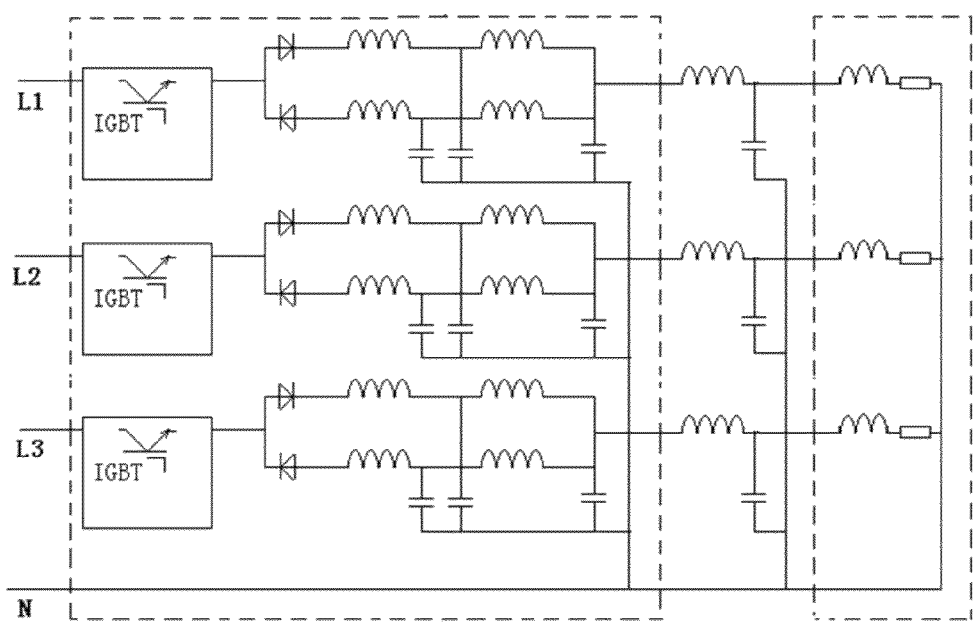
FIG. 11 is an AC voltage wave shape diagram according to a fourth embodiment of the present disclosure.

Shown as FIG. 11, the embodiment 4 is similar to the embodiment 3. The difference is that, in the embodiment 4, the LC filtering circuit is applied to the main circuit structure for three phases alternating chopping. The LC filtering circuit is connected in the alternating current chopping main circuit for naturally freewheeling and load circuit in series. The Specifics is not described in this specification.

In the above mentioned four embodiments, the chopping switch element assembly (3) comprises an IGBT transistor and a rectifier bridge, or comprises two IGBT transistors.

The embodiments of the present invention are described in detail in accordance with the above contents with the specific preferred embodiments. However, this present disclosure is not limited to the specific embodiments. For the ordinary technical personnel of the technical field of the present disclosure, on the premise of keeping the conception of the present disclosure, the technical personnel can also make simple deductions or replacements, and all of which should be considered to belong to the protection scope of the present disclosure.

I claim:

1. A naturally freewheeling alternating current (AC) chopping main circuit structure, comprising:
an AC chopping main circuit (1) connected to a commercial power; and
an inductive load (2);
wherein,
the AC chopping main circuit (1) comprises a chopping switch element assembly (3), two inductance coils L1 and L2, two diodes D1 and D2, and a capacitor C, one end of inductance coil L1 and one end of inductance coil L2 are connected together to form a junction point, the junction point is connected to one end of the capacitor C, the other end of the inductance coil L1 is connected with a negative electrode of the diode D1 in series, the other end of the inductance coil L2 is connected with a positive electrode of the diode D2 in series, an output end of the chopping switch element assembly is connected with a junction point of the positive electrode of the diode D1 and the negative electrode of the diode D2, an input end of the chopping switch element assembly (3) and the other end of the capacitor are connected with the commercial power line respectively, the inductive load (2) is connected with the capacitor C in parallel.

2. The naturally freewheeling AC chopping main circuit structure of claim 1, wherein the inductance coils L1 and L2 are air core coils, magnetic core coils or core coils.

3. The naturally freewheeling AC chopping main circuit structure of claim 1, wherein the input end of the chopping switch element assembly and the other end of the capacitor are respectively connected with a phase line and a neutral line of a single-phase circuit.

4. The naturally freewheeling AC chopping main circuit structure of claim 1, wherein the alternating current chopping main circuit (1) is applied to a three phase circuit.

5. The naturally freewheeling AC chopping main circuit structure of claim 1, wherein the chopping switch element assembly (3) comprises an Insulated Gate Bipolar Transistor (IGBT) transistor and a rectifier bridge.

6. The naturally freewheeling AC chopping main circuit structure of claim 1, wherein the chopping switch element assembly (3) comprises two IGBT transistors.

7. A naturally freewheeling alternating current (AC) chopping main circuit structure,
comprising:
an AC chopping main circuit (1) connected to a commercial power; and
an inductive load (2);
wherein the AC chopping main circuit (1) comprises a chopping switch element assembly (3), inductance coils L1-1, L1-2, L2-1, L2-2, and L3, two diodes D1 and D2 and capacitors C1, C2, C3, and C4, a positive electrode of the diode D1 is connected with a negative electrode of the diode D2, a negative electrode of the diode D1 is connected with the inductance coils L1-1 and L1-2 in series, a positive electrode of the diode D2 is connected with the inductance coils L2-1 and L2-2 in series, one end of the inductance coil L1-2 and one end of the inductance coil L2-2 are connected together to form a junction point, the junction point is connected with one end of the capacitor C3, one end of the inductance coil L3 is connected with the one end of the capacitor C3, the other end of the inductance coil L3 is connected with one end of the capacitor C4, a junction point between the inductance coils L2-1 and L2-2 is connected with one end of the capacitor C1, a junction point between the inductance coils L1-1 and L1-2 is connected with one end of the capacitor C2, an output end of the chopping switch element assembly (3) is connected with a junction point between a positive electrode of the diode D1 and a negative electrode of the diode D2, an input end of the chopping switch element assembly (3) and a junction point of the other ends of the capacitors C1, C2, C3, and C4 are respectively connected with a commercial power line, the inductive load (2) is connected with the capacitor C4 in parallel.

8. The naturally freewheeling AC chopping main circuit structure of claim 7, wherein the alternating current chopping main circuit (1) is applied to a three phase circuit.

9. The naturally freewheeling AC chopping main circuit structure of claim 7, wherein the chopping switch element assembly (3) comprises an IGBT transistor and a rectifier bridge.

10. The naturally freewheeling AC chopping main circuit structure of claim 7, wherein the chopping switch element assembly (3) comprises two IGBT transistors.

* * * * *